(12) United States Patent
Kinkade et al.

(10) Patent No.: US 9,886,448 B2
(45) Date of Patent: Feb. 6, 2018

(54) MANAGING DOWNLOADS OF LARGE DATA SETS

(71) Applicant: Media Gobbler, Inc., Hollywood, CA (US)

(72) Inventors: Phillip M. Kinkade, Los Angeles, CA (US); Christopher Kantrowitz, Los Angeles, CA (US); Matthew Collin Dauphinee, Los Angeles, CA (US)

(73) Assignee: Media Gobbler, Inc., Hollywood, CA (US)

( * ) Notice: Subject to any disclaimer, the term of this patent is extended or adjusted under 35 U.S.C. 154(b) by 0 days.

(21) Appl. No.: 14/562,571

(22) Filed: Dec. 5, 2014

(65) Prior Publication Data
US 2015/0249694 A1    Sep. 3, 2015

Related U.S. Application Data

(60) Provisional application No. 61/912,618, filed on Dec. 6, 2013.

(51) Int. Cl.
G06F 17/30    (2006.01)
H04L 29/06    (2006.01)
H04L 29/08    (2006.01)

(52) U.S. Cl.
CPC ...... *G06F 17/30174* (2013.01); *H04L 65/403* (2013.01); *H04L 67/10* (2013.01); *H04L 67/2842* (2013.01); *H04L 67/2895* (2013.01)

(58) Field of Classification Search
CPC .......................... H04L 67/1095; H04L 67/1097
See application file for complete search history.

(56) References Cited

U.S. PATENT DOCUMENTS

| | | | | |
|---|---|---|---|---|
| 7,143,357 | B1* | 11/2006 | Snibbe | G06F 3/0483 709/204 |
| 7,660,416 | B1* | 2/2010 | Kline | G06Q 10/10 380/216 |
| 8,849,955 | B2* | 9/2014 | Prahlad | G06F 17/3002 709/211 |
| 8,943,027 | B1* | 1/2015 | Dwan | G06F 17/30117 707/661 |

(Continued)

*Primary Examiner* — Jimmy H Tran
(74) *Attorney, Agent, or Firm* — Patent GC LLC (57) ABSTRACT

In a system for downloading large data sets, when a user downloads a project or other large data set from the file sharing service, the user's computer first determines whether files in the data set are already resident on local storage. Files that are in a locally connected storage device, including network connected storage devices, are copied to the download location specified for the data set to be downloaded. Files that are not in local storage are then downloaded to the download location specified for the data set. Files in local storage are indexed to facilitate matching with files used in the project. Such indexing is based on processing the media data in the media data files to ensure that there is a match. For example, a signature can be generated from a portion of a file, such as a first block of media data from a file. This signature can be added to an index, along with other information about the file, such as metadata from the file, file names or file identifiers and the like. A matching algorithm processes files in the project to be shared, and matches them against the index.

20 Claims, 7 Drawing Sheets

(56) References Cited

U.S. PATENT DOCUMENTS

| | | | | |
|---|---|---|---|---|
| 2002/0188772 A1* | 12/2002 | Radcliffe | G09B 5/00 | 710/38 |
| 2003/0217171 A1* | 11/2003 | Von Stuermer | G11B 27/036 | 709/231 |
| 2005/0050345 A1* | 3/2005 | Dowdy | G06F 21/10 | 713/193 |
| 2007/0143377 A1* | 6/2007 | Waites | G06F 17/30017 | |
| 2008/0091717 A1* | 4/2008 | Garbow | G06F 17/30749 | |
| 2008/0133551 A1* | 6/2008 | Wensley | G06F 21/10 | |
| 2009/0077170 A1* | 3/2009 | Milburn | G06F 19/3425 | 709/203 |
| 2009/0193345 A1* | 7/2009 | Wensley | H04L 65/4015 | 715/756 |
| 2009/0234735 A1* | 9/2009 | Maurer | G06F 21/10 | 705/14.49 |
| 2009/0260060 A1* | 10/2009 | Smith | G06Q 10/10 | 726/3 |
| 2011/0137991 A1* | 6/2011 | Russell | G06Q 10/06 | 709/204 |
| 2011/0307527 A1* | 12/2011 | Roenning | G06F 17/30041 | 707/803 |
| 2013/0117240 A1* | 5/2013 | Taylor | G06F 17/30194 | 707/690 |
| 2014/0052734 A1* | 2/2014 | Lee | G06F 17/30312 | 707/741 |
| 2014/0122592 A1* | 5/2014 | Houston | H04L 67/1095 | 709/204 |
| 2014/0195516 A1* | 7/2014 | Balakrishnan | G06F 17/30126 | 707/722 |
| 2014/0258418 A1* | 9/2014 | Subramani | H04L 67/1095 | 709/205 |
| 2014/0344191 A1* | 11/2014 | Lebow | G06N 5/02 | 706/11 |
| 2014/0379632 A1* | 12/2014 | Gera | G06F 9/5061 | 707/608 |
| 2014/0379648 A1* | 12/2014 | Chiu | G06F 17/30174 | 707/624 |
| 2015/0032785 A1* | 1/2015 | Itasaki | G06F 17/30106 | 707/827 |

* cited by examiner

MANAGING DOWNLOADS OF LARGE DATA SETS

BACKGROUND

Internet-based file sharing and storage services provide a useful way to share information among and synchronize data storage for groups of people that are collaborating on a project or otherwise sharing large data sets. As an example, with large, shared digital media projects, such as music productions, movies, and other audio or audiovisual works, the amount of data to be shared can be very large. Typical file sharing and storage systems can provide a poor user experience due to download performance for very large data sets.

SUMMARY

This Summary introduces selected concepts in simplified form that are further described below in the Detailed Description. This Summary is intended neither to identify key or essential features of the claimed subject matter, nor to limit the scope of the claimed subject matter.

Using a file sharing system, when a user downloads a project from the file sharing service, the user's computer first determines whether files used in the project are already resident on local storage. These files may be resident for several reasons, but not necessarily because they were previously downloaded from the file sharing service. Files that are in local storage are copied to the download location specified for the project. Files that are not in local storage are then downloaded to the download location specified for the project. This file sharing system also avoids redundant file downloads when downloading large data sets where a file in that data set already exists in a destination storage device.

Files in local storage are indexed to facilitate matching with files used in the project. Such indexing is based on processing data in the files to efficiently locate matching files. For example, a signature can be generated from a portion of a file, such as a first block of media data from a file. This signature can be added to an index, along with other information about the file, such as metadata from the file, file names or file identifiers and the like. A matching algorithm processes files in the project to be shared, and matches them against the index.

In one implementation, the file sharing system can preprocess a project to allow it to be more quickly downloaded when accessed by the user.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which users share large media projects, for which downloads can be managed to be more efficient.

Figure 1:
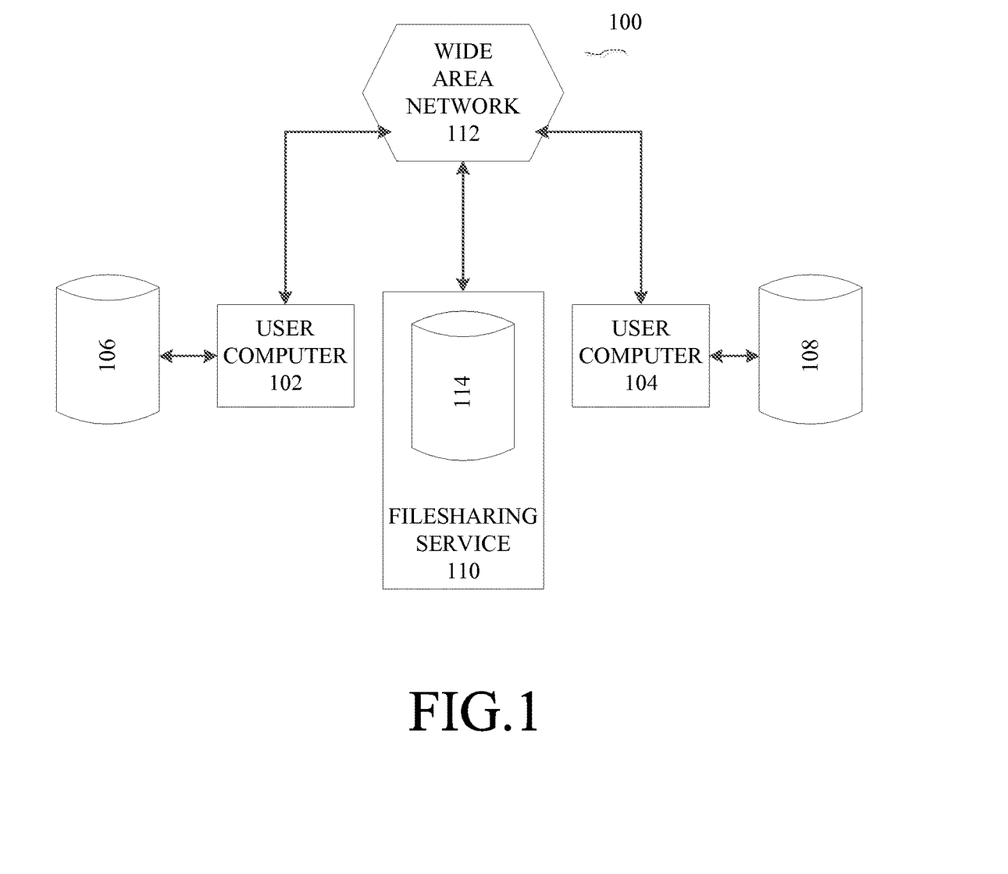
FIG. 1 is a block diagram of an example system in which users share large media projects.

Referring to FIG. 1, a system 100 includes a first user computer 102 and a second user computer 104. This example illustrates only two users, but the example can be generalized to any number of users among whom a project of multiple large files is being shared. Sharing can occur one-to-one or one-to-many. Each user computer 102, 104 is a typical general purpose computer, such as described below in connection with FIG. 6.

The user computer typically includes one or more applications that allow a user to work on projects with large data sets. An example of such a project is creative projects, such a music production, an audiovisual production and the like, using tools such as digital audio workstations, video editing system, music production systems, music sequencers and other applications for creating digital media productions. In such projects, large data sets commonly are stored in multiple computer data files on one or more storage devices 106, 108 connected to the user computers 102, 104.

Such projects generally involve collaboration among a large number of people in a variety of roles, including but not limited to creative, managerial, and executive functions. To support such collaboration, a file sharing service 110, accessible through a wide area, publicly accessible computer network 112, such as the internet, is used. Such file sharing services allow a user, for example on user computer 102, to upload and store a project on the storage 114 of the file sharing service, and then share that project with another user. For example, the user on user computer 104 can then access the project and download it from the storage 114 to the user computer's local storage 108.

Large, creative, digital media projects present unique challenges to such file sharing systems, primarily due to the large size of projects. Such projects generally include a. one or more metadata file defining how various media from various media data files are to be combined, and b. multiple media data files in which media data is stored. A single project can include many gigabytes (GB) of data in multiple data files and can take a long time to download from a file sharing service, and generally cannot be transmitted through electronic mail systems due to the file sizes.

Although FIG. 1 shows one storage device per user computer, each user computer typically has many storage devices, of different storage capacities and physical configurations, all of which are accessible by the user computer. Such local storage devices can include network attached storage devices, storage area networks and other storage devices that are connected through relatively fast connections to the user computer, in comparison to storage devices 114 accessed through a file sharing service 110 over a wide area computer network 112, such as the internet. In particular, the read throughput of the locally connected drive is significantly greater than an estimated download speed of the network connection to the file sharing service.

To improve the download experience using file sharing system 112, when a user downloads a set of files from the file sharing service, the user's computer first determines whether any of the files in the set are already resident on local storage, i.e., any locally connected storage device such as a hard drive. If the large data set is a defined as a project, i.e., there is a form of project file specifying a set of data files and how they are combined, then the transfer process analyzes whether the files used in the project are available in local storage. Files that are in local storage are copied to the download location specified for set to be downloaded. If the file is available in multiple local storage devices, then the local storage device with the fastest transfer time can be used. Files that are not in local storage are then downloaded to the download location specified for the set to be downloaded. When copy speed from local storage is faster than download speed from the file sharing service, then transfer speed is improved. The system can select from copies of the same file located on a multiplicity of local storage devices, and can elect to choose the combination of source storage device to target storage device that will yield the quickest copy time.

Figure 2:
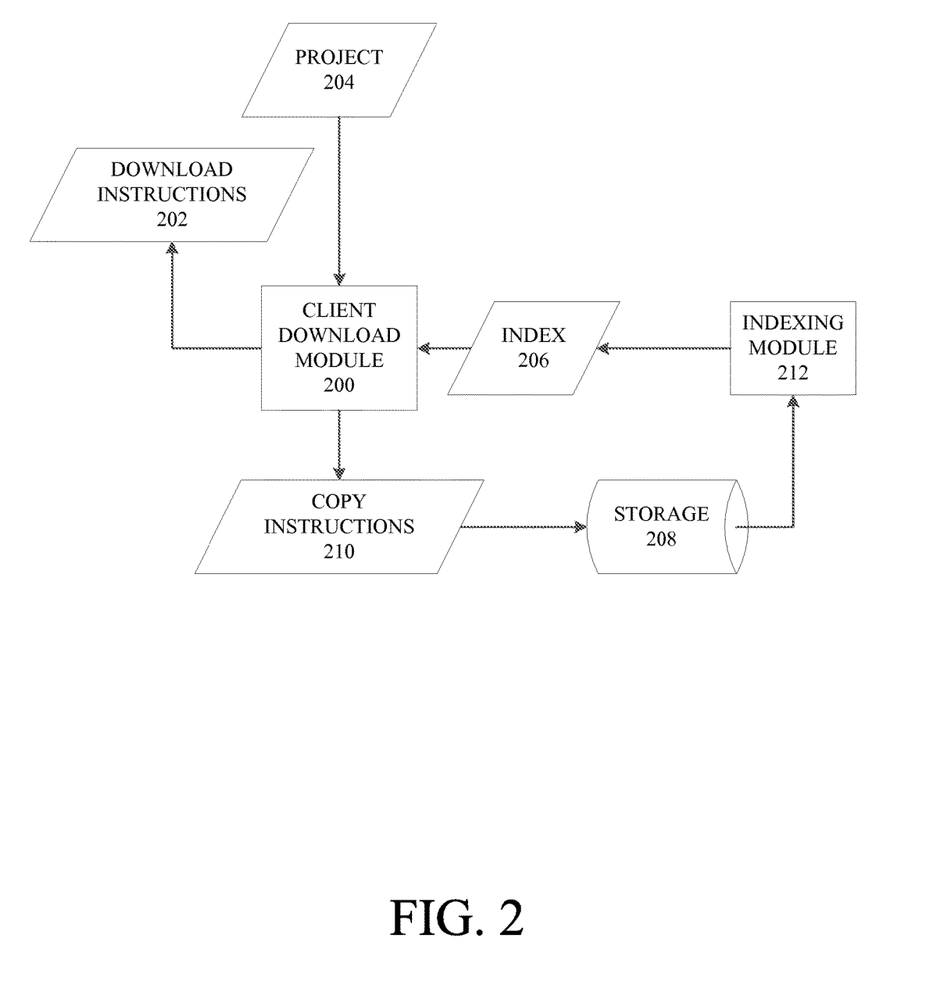
FIG. 2 is a more detailed block diagram illustrating an example implementation of such a system.

An example implementation will now be described in more detail in connection with FIG. 2. The data flow diagram in FIG. 2 illustrates the data flow and operation of download software for the file sharing service that is stored on the user computer 102, 104.

Such software can be designed to have a client download module 200 that provides download instructions 202 to the shared file service and receives project files 204 from the shared file service. The client download module 200 also accesses an index 206 indicating the files already available on the local storage 208. The client download module determines, for each file in a project, whether the file is available in local storage 208, using the index 206. If the file is available in the local storage 208, then a copy instruction 210 is generated, causing the file to be copied from its current location in local storage to the download location. The download location can be, for example, a user-specified folder for the whole project on the local storage. If the file is not available in local storage 208, then the client download module 100 sends a download request 202 to the file sharing service, and the file is downloaded to the download location.

Another module of the software is the indexing module 220. The indexing module accesses files on local storage 208 to index those files and generate the index 206. Such indexing is described in more detail below. In general, a portion of the actual media within the media file, such as the first block of data, is accessed to generate a form of signature, such as a hash code. Other metadata within the file or about the file from the file system also can be used to generate the signature, or can be used as index data along with the signature. An index is built that maps the signature data to the path and file name for the file. Given such an index, similar signatures are generated for project files, which then are compared to signatures in the index, through a lookup operation by the client download module, to identify matching files.

The indexing module can be set to process only those files that are being processed through the file sharing service. Alternatively the indexing module can be set to process any files within a designated portion of the locally connected storage devices. The indexing module can be designed to continually scan locally connected storage devices as files are added to the storage devices. The indexing can be disabled if the user computer is operating on a battery to conserve battery power.

Figure 3:
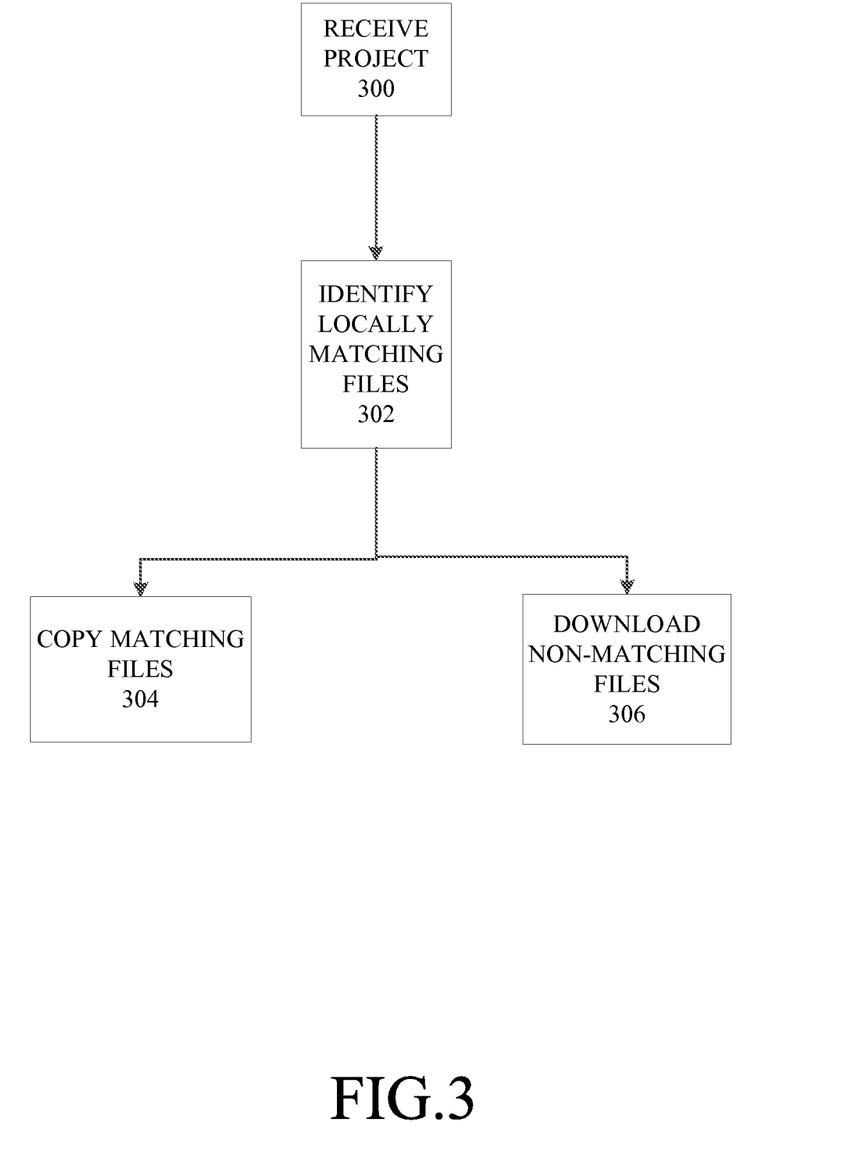
FIG. 3 is a flow chart of an example implementation of a download process.

FIG. 3 is a flow chart describing the operation of an example implementation of such a file sharing system. The client software receives 300 data about a project to be downloaded. The client software then identifies 302 files on local storage that match files used in the project. The matching files are copied 304 from their current locations in storage to a download location, such as a user-specified folder on local storage for the project. The remaining files, that did not match locally-stored files, are downloaded 306 from the file sharing service. The copying and downloading can occur asynchronously and/or in parallel with respect to each other.

Figure 4:
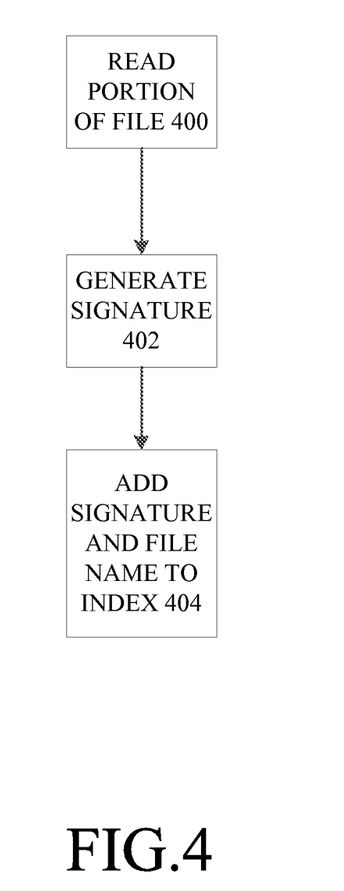
FIG. 4 is a flow chart of an example implementation of indexing one or more local storage devices.

FIG. 4 is a flow chart describing an example implementation of indexing files on local storage. In this implementation, a signature of a file is created from a first block of media data in the media data file. The portion of the file is read 400. A signature is generated 402 from at least the read media data, and optionally other data. The signature and path and file name for the media file are then added 404 to the index.

Figure 5:
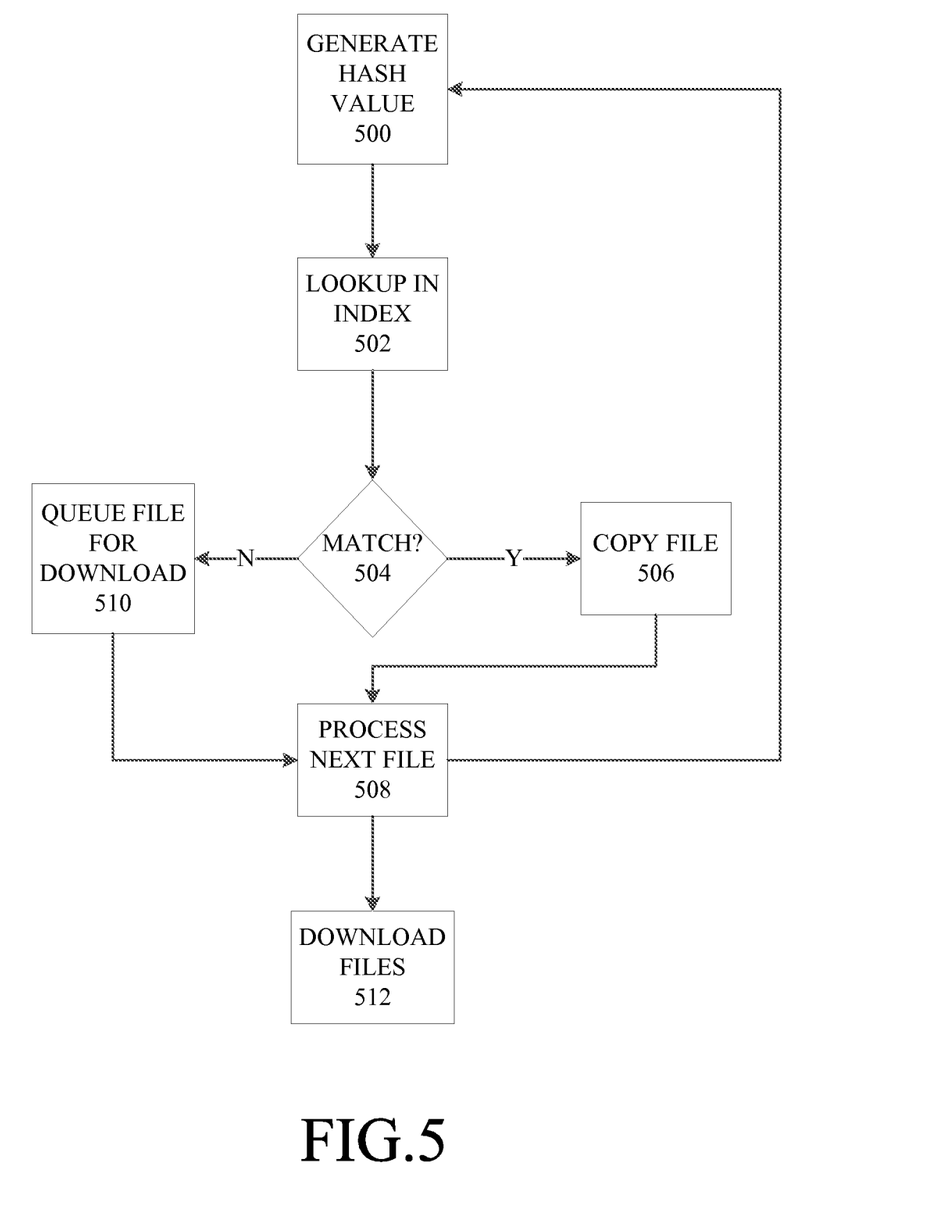
FIG. 5 is a flow chart of an example implementation of matching within the download process.

Referring now to FIG. 5, an example implementation of how such an index can be used will now be described. For each file in a project, a signature is generated 500 in the same manner as the indexer generates a signature. Given that signature, the client download module looks up 502 the signature in the index. If a match is found, as indicated at 504, then the matched file is copied 506 to a download location for the project. The next file is then processed 508, 500. If there is no match, in the index, for the file from the project, then that file is added 510 to a download list. When all of the locally matching files have been copied, the files on the download list are then downloaded 512.

In one implementation, when a file is accessed for upload or download by the file sharing service client software, a signature is created and stored with that file. The local index also is updated with that signature and the path and file name for that file. An example implementation of a signature, also called a "download hint" is hash value generated using a lightweight hash function. Such a hash value can be used to guess whether a local file has the same data as a file available for download. The hash value does not need to be cryptographically strong, and is generally a compromise between calculation speed and collision resistance (when two different files generate the same hash values).

One implementation uses a v1 download hint, which is the SH1 hash of the first 4096 bytes of data, or the entire file if the size is less than 4096 bytes. These hints are represented in string format as version_sha1_size, for example:

1_5971AAC62D1733C90452A2BA8DAE5128ECC8D 136_4096.

This string represents a version 1 download hint for a file whose first 4096 bytes have a SHA1 hash of 5971AAC62D1733C90452A2BA8DAE5128ECC8D136.

Then, for each file, its path and download hint are stored in a persistent database for each user computer. In one implementation, the path of each candidate is stored as a 'volume path,' which takes the form of user-id@volume-guid:path-from-root. This path format allows the system to locate a candidate file, even if the volume the file resides on has changed names or drive letters. For example, if the C: drive had a globally unique identifier (GUID) of AABBC-CDD and a user identifier is 11223344, then the volume path pointing to C:\Test.txt is: 11223344@AABBCCDD:\Test.txt The database should be structured to allow queries such as updating or inserting a path with a new signature, finding all paths with a given signature and deleting a path and its signature.

When a new file is stored on locally connected storage, or an existing file is modified, a signature for the file is created and the database is updated. If a file cannot be found, either because the drive was removed, or the file deleted, or the like, then the database should be updated to remove that file.

For user privacy, the paths can be encrypted, for example by using AES-256 with PKCS#7 padding. The key used to encrypt each path can be, for example, a hash such as an MD5 hash of the file name and its signature concatenated together, or hexadecimal:
801ab24683a4a8c433c6eb40c48bcd9d
d11c7e9c409c6ca80008c5dd01d44d1e The initialization vector used for encryption can be, for example, an MD5 hash of the plain text volume path. Before being saved to the database, the cipher text can be appended to the IV, and then the result is encoded as a hexadecimal string. For example, 11223344@AABBCCDD:\Test.txt would result in:
b6e6cd558c9d1c357d7be676dc2b7888
012f217a747b9a849900e6e304ad5e63
f6111b5a039e0248c4d8d55377a1d0ed As noted above in connection with FIG. 5, in order to determine whether a locally connected file is the same as a file in a project to be downloaded, the signature of the data being downloaded is retrieved. The signature can be stored on the server and sent to the client download module before the client module begins downloading. Alternatively, the server can send only a portion of the data to be used for calculating the signature, which the client uses to calculate the signature for that file. After the signature for file is available, a list of matching candidates can be retrieved from the database. In some implementation, a file can be downloaded while the system searches for a match.

Figure 6:
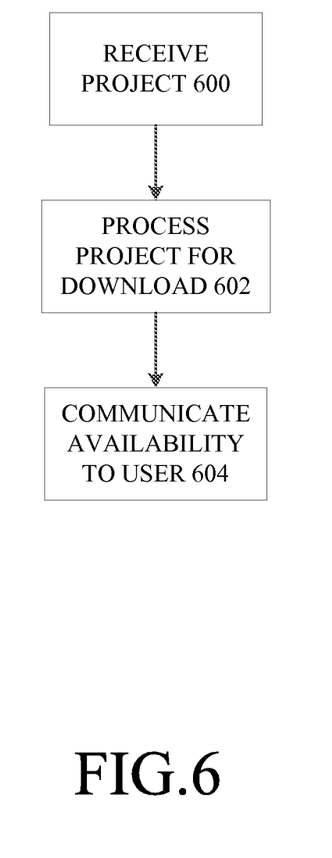
FIG. 6 is a flow chart of an example implementation of forward caching of a project to be shared.

A project also can be prepared by the file sharing service for download by a user when the user is not connected to the file sharing service. The project can be, for example, encrypted along with information about its files' signatures. In FIG. 6, a project is received 600 by the file sharing service. The file sharing service processes 602 the project for download. Next, the availability of the project for download is communicated 604 to the user. In particular, the data is encrypted and placed in an unusable format and downloaded to the end user device. The user obtains decryption keys after being authenticated and authorized to access the data. In this process, the user will only need to decrypt the data locally instead of waiting for download from remote file storage.

Having now described an example implementation, a general purpose computer in which components of such a system can be implemented will now be described. The following description is intended to provide a brief, general description of a suitable computer with which components of this system can be implemented. The system can be implemented with numerous general purpose or special purpose computing hardware configurations. Examples of well known computers that may be suitable for any given component include, but are not limited to, personal computers, server computers, hand-held or laptop devices (for example, media players, notebook computers, cellular phones, smart phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
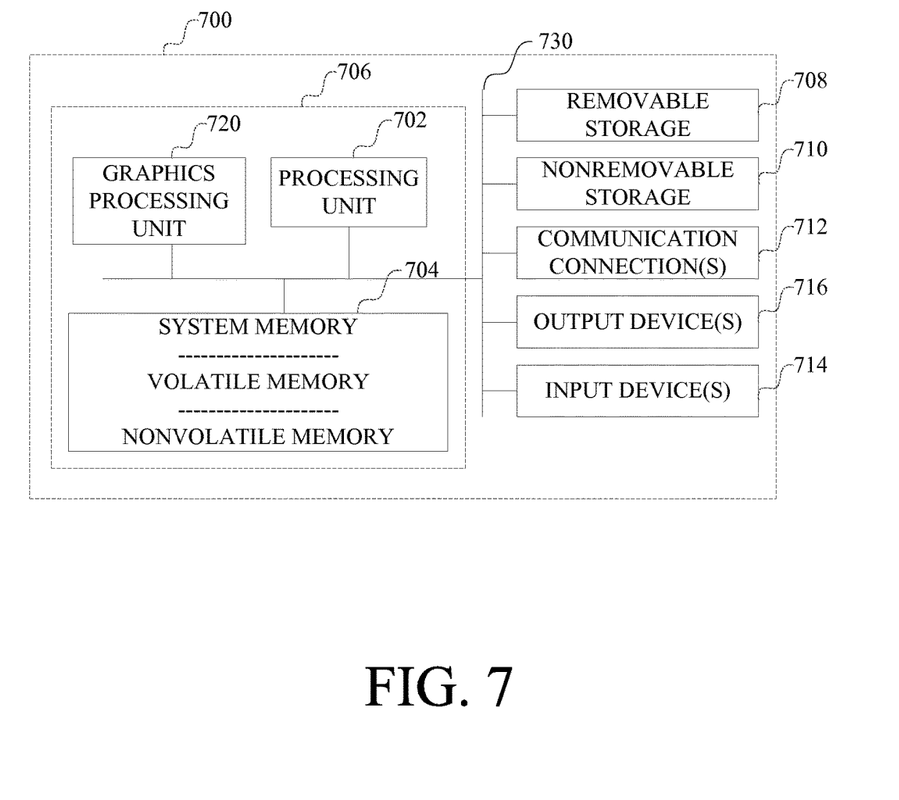
FIG. 7 is a block diagram of an example computer system.

FIG. 7 illustrates an example computer 700. A computer 700 typically includes at least one processing unit 702 and memory 704. The computer may include multiple processing units and/or additional co-processing units such as graphics processing unit 720. Memory 704 may be volatile (such as RAM), non-volatile (such as ROM, flash memory, etc.) or some combination of the two. This configuration is illustrated in FIG. 7 by dashed line 706.

Computer 700 may include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 700. Any such computer storage media may be part of computer 700. A storage medium is any addressable medium in which data can be stored in and retrieved from physical storage locations by the computer.

Computer 700 may also contain communications connection(s) 712, which are interface devices that allow a computer to connect to and communicate with other devices over a communication medium. By way of example, and not limitation, communication media includes wired media such as a wired network or direct-wired connection, and wireless media such as acoustic, RF, infrared and other wireless media.

Computer 700 may have various input device(s) 714 such as a keyboard, mouse, pen, camera, touch input device, and so on. Output device(s) 716 such as a display, speakers, a printer, and so on may also be included. All of these devices are well known in the art and need not be discussed at length here.

The various components in FIG. 7 are generally interconnected by an interconnection mechanism, such as one or more buses 730.

Components of such a system may be implemented using specially designed hardware components using software on a general purpose programmable computer, including computer-executable instructions and/or computer-interpreted instructions, such as program modules, being processed by the computer. Generally, program modules include routines, programs, objects, components, data structures, and so on, that, when processed by a processing unit, configure the computer to perform particular tasks or implement particular abstract data types or implement particular components. This system may be practiced in distributed computing environments where tasks are performed by remote processing devices that are linked through a communications network. In a distributed computing environment, program modules may be located in both local and remote computer storage media including memory storage devices.

It should be understood that the subject matter defined in the appended claims is not necessarily limited to the specific implementations described above. The specific implementations described above are disclosed as examples only.

What is claimed is:

1. A process for accelerating download of media data files of a digital media project from a remote file sharing service for the project over a network connection to a user computer, the digital media project including a plurality of media data files and one or more project files specifying a set of the plurality of media data files and defining how media from the specified set of the plurality of media data files are combined into a digital media production, comprising:

receiving a user-specified download location in local storage of the user computer for the one or more project files and the specified set of the plurality of media data files for the project;

downloading the one or more project files to the local storage of the user computer;

after downloading the one or more project files to the download location in the location storage of the user computer:

identifying the plurality of media data files used in the project from the downloaded one or more project files;

identifying, from among the identified plurality of media data files in the project, any media data files used in the project and which are resident on a locally connected storage device of the user computer;

copying the identified media data files in the locally connected storage device to the download location for the project in the local storage of the user computer;

adding, from among the identified plurality of media data files in the project, any media data file not in the locally connected storage device to a download list; and after copying the identified media data files in the local connected storage device, requesting download of the media data files for the project not in the locally connected storage device in the download list to the download location in the local storage of the user computer from the remote file sharing service.

2. The process of claim 1, wherein the identifying any media data files on the locally connected storage device comprises:

computing signatures from at least a portion of media data from media data files on the locally connected storage device; and matching signatures from media data files in the project to the computed signatures of the media data files on the locally connected storage device.

3. The process of claim 2, wherein the computed signatures of the media data files on the locally connected storage device are stored in an index on the local storage of the user computer.

4. The process of claim 3, wherein the index, for each media data file having a computed signature, maps the computed signature of the media data file to a path and file name for the media data file in the locally connected storage device.

5. The process of claim 4, wherein the computed signature is computed for each media data file stored in the locally connected storage device.

6. The process of claim 5, further comprising continually scanning the locally connected storage device as files are added to the locally connected storage device with an indexing module to compute, and add to the index, signatures for media data files as the media data files are added to the locally connected storage device.

7. The process of claim 2, further comprising:

for each media data file in the project, computing a signature and storing the signature in association with the project on the remote file sharing service.

8. The process of claim 7, wherein matching signatures from files in a project to signatures of files on the locally connected storage device comprises:

accessing the computed signatures for the media data files for the project from the remote file sharing service; and comparing the signatures of the media data files for the project with the computed signatures of media data files on the locally connected storage device.

9. The process of claim 2, further comprising:

receiving only a portion of each of the media data files of the project; and for media data files of the project, computing the signatures of the media data files on the user computer using the received portions of the media data files.

10. The process of claim 1, wherein the identified media data files were not previously downloaded from the remote file sharing service.

11. The process of claim 1, further comprising:

in response to identifying a media data file which is available in multiple storage devices locally connected to the user computer, selecting one of the multiple storage devices with a fastest transfer time for copying the identified media data file to the download location.

12. The process of claim 1, wherein the locally connected storage device comprises a network attached storage device.

13. The process of claim 1, wherein the locally connected storage device comprises a local storage device in the user computer.

14. The process of claim 1, wherein the locally connected storage device comprises a storage device having a read through greater than an estimated download speed of the network connection to the remote file sharing service.

15. The process of claim 1, wherein the project includes a plurality of gigabytes in multiple data files of media data.

16. The process of claim 1, wherein the plurality of media data files include video data.

17. The process of claim 1, wherein the plurality of media data files include audio data.

18. The process of claim 1, further comprising:

the remote file sharing service encrypting the media data files, metadata files and signatures of the project.

19. The process of claim 18, further comprising downloading the encrypted media data files, metadata files and signatures of the project.

20. The process of claim 19, further comprising decrypting the media data files locally for media data files not found in the locally connected storage device.

* * * * *